United States Patent [19]

Craun et al.

[11] Patent Number: 5,554,671
[45] Date of Patent: Sep. 10, 1996

[54] LOW VOC, AQUEOUS DISPERSED ACRYLIC EPOXY MICROGELS

[75] Inventors: Gary P. Craun, Berea, Ohio; Victor V. Kaminski, Cary, N.C.

[73] Assignee: The Glidden Company, Cleveland, Ohio

[21] Appl. No.: 407,664

[22] Filed: Mar. 21, 1995

Related U.S. Application Data

[63] Continuation-in-part of Ser. No. 249,251, May 25, 1994, abandoned.

[51] Int. Cl.$^6$ .............................. C08K 3/20; C08L 63/02
[52] U.S. Cl. .................... 523/408; 523/409; 523/412; 525/119
[58] Field of Search ........................... 523/409, 412, 523/408; 525/119

[56] References Cited

U.S. PATENT DOCUMENTS 4,897,434  1/1990  Shimada et al. ................ 523/409

Primary Examiner—Melvyn I. Marquis
Assistant Examiner—D. Aylward
Attorney, Agent, or Firm—Thomas M. Schmitz

[57] ABSTRACT

An aqueous dispersed, very low VOC (less than about 0.4 pounds per gallon), protective surface coating composition comprises crosslinked microgel particles of less than 1 micron and produced by dispersing low molecular weight carboxyl functional addition copolymer into water, stably dispersing diepoxide epoxy resin in the aqueous dispersion, and coreacting the diepoxide resin with the carboxyl functional copolymer to provide epoxy-ester crosslinked microgel polymer particles stably dispersed into water. The microgel particles are useful as a polymeric binder for aqueous dispersed coatings particularly useful for coating interior surfaces of beer and beverage cans.

22 Claims, No Drawings

LOW VOC, AQUEOUS DISPERSED ACRYLIC EPOXY MICROGELS

This is a continuation in part of Ser. No. 249,251 filed. May 25, 1994, abandoned.

This invention pertains to very low VOC, aqueous dispersed acrylic copolymers used as a polymeric binder for protective surface coatings applied to a substrate and particularly spray applied to interior surfaces of can containers for beverages and foods.

BACKGROUND OF THE INVENTION

Industrial coatings are surface protective coatings (paint coatings) applied to substrates and typically heat cured to form continuous films for decorative purposes as well as to protect the substrate. A protective coating ordinarily comprises an organic polymeric binder, pigments, and various paint additives, where the polymeric binder acts as a fluid vehicle for the pigments and imparts rheological properties to the fluid paint coating. Upon curing, the polymeric binder hardens and functions as a binder for the pigments and provides adhesion of the dried paint film to the substrate. The pigments may be organic or inorganic and functionally contribute to opacity and color in addition to durability and hardness, although some paint coatings contain little or no opacifying pigments and are described as clear coatings. The manufacture of paint coatings involves the preparation of a polymeric binder, mixing of component materials, grinding of pigments in the polymeric binder, and thinning to commercial standards.

Epoxy resins are particularly desirable for use in protective surface coating materials as a vehicle or polymeric binder for pigments, fillers, and other additives where the epoxy resins advantageously provide toughness, flexibility, adhesion, and chemical resistance. Water-dispersed coating compositions containing epoxy resins are highly desirable for can coating compositions and particularly useful for interior surfaces. Comings for soft drink and beer cans, for instance, are critical due to taste sensitivity wherein such can coatings must not alter the product taste of canned beverages. Taste problems can occur in a variety of ways such as by leaching of coating components into the beverage, or by adsorption of flavor by the coating, or sometimes by chemical reaction, or by some combination thereof.

Container coating technology frequently utilizes an epoxy resin which has been grafted with acrylic monomers, styrene, and methacrylic acid. This grafted epoxy resin is prepared in solvent, usually butyl cellosolve, and n-butanol, to maintain low processing viscosities and then reduced with water by a direct or inverse let down procedure. Although cured film properties are highly desirable, such coatings suffer from the fact that sizeable amounts of solvent are required to obtain good performance. High molecular weight epoxy resins typically require 50% to 90% solvent (based on total solids plus organic solvent) before reducing with amine and water.

Epoxy based can coatings comprising a carbon grafted acrylic chain produced in the presence of an extender resin are disclosed in U.S. Pat. No. 4,399,241 and U.S. Pat. No. 4,482,671 while U.S. Pat. No. 4,595,716, and U.S. Pat. No. 5,157,078 teach a carbon grafting process involving solvent polymerization at moderate temperatures with high levels of peroxide initiator to produce a carbon-graft polymer. The high solvent levels, however, invariably carry over to the aqueous dispersion when the resulting polymers are dispersed into water to produce a VOC (volatile organic compounds) level considerably above 2 and typically between 3 and 4 pounds volatile organic compounds per gallon of resin solids.

Commonly assigned U.S. Pat. No. 5,290,828 discloses an acrylic grafted epoxy polyester terpolymer produced by in-situ copolymerization of ethylenic monomers with low molecular weight epoxy and unsaturated polyester resins where carboxyl monomers esterify epoxy groups while monomer double bonds coreact with polyester double bonds to form the terpolymer. Commonly assigned Ser. No. 222,029 filed Apr. 4, 1994 discloses an acrylic grafted epoxy-ester produced by first esterifying epoxy resin with a carboxyl functional unsaturated polyester to form an unsaturated epoxy-ester. The unsaturated epoxy-ester is dispersed into water and followed by in-situ copolymerization of ethylenic monomers in the aqueous dispersion, where the copolymerized monomers partially graft to the preformed unsaturated epoxy-ester.

Coating compositions based on microgels are shown in U.S. Pat. No. 4,897,434 where epoxy esters are preformed, then dispersed into water, and thereafter further crosslink available epoxy and carboxyl groups on the preformed epoxy-ester.

It now has been found that a preformed, carboxyl functional, low molecular weight acrylic addition copolymer of copolymerized ethylenic monomers, including carboxyl functional ethylenic monomer, can be utilized advantageously as an aqueous dispersing or suspending agent for dispersing an epoxy resin into water to produce a very low VOC coating having a VOC (volatile organic compounds) less than about one pound per gallon of resin solids. The resulting water dispersed epoxy resin provides an emulsion polymerization medium, where the addition copolymer dispersing agent is esterified with the epoxy functional resin to form crosslinked microgel particles stably dispersed in water. The acid functional, low molecular weight addition copolymer, preferably an acrylic copolymer, (preferably 2,000 to 20,000 Mn) can be dispersed in ammonia water to form small particle size dispersions (ca 50 nm), while subsequent crosslinking with liquid epoxy resin converts these dispersions to microgels. The water dispersed, crosslinked small particle size provide good storage stability, rheology control, along with exceptional film properties including excellent water resistance, low temperature cure, excellent flexibility, and good resistance to odor adsorption. This invention avoids the use of acid functional polyesters, which can slowly hydrolyze causing gelation while rheology of very low viscosity products can only be controlled by adding rheological control agents. In this invention, the acrylic copolymer dispersant can be synthesized at a very low solvent level (<1 lb/gal VOC), dispersed into ammonia water, and subsequently crosslinked with liquid epoxy resin to form stable microgel particles. Crosslinking of the addition copolymer with diepoxide while stably dispersed in water produces very small size crosslinked microgel particles, a physical property particularly useful for producing tough but resilient coating films applied to a substrate. Further advantages rely on an acid functional acrylic to produce small particle size dispersions (ca. 50 nm) with low applied shear which will not hydrolyze and provide excellent storage stability. Viscosity can be easily controlled by adjusting acrylic Mn, carboxylic acid concentration, comonomer type, and degree of reaction with epoxy resin. These and other advantages of this invention will become more apparent by referring to the detailed description and illustrative examples.

SUMMARY OF THE INVENTION

Briefly, the invention pertains to an aqueous dispersed protective coating composition containing a polymeric binder containing very low levels of organic solvent, where the polymeric binder comprises aqueous dispersed microgel particles produced by dispersing in water a carboxyl functional addition copolymer suspending agent to form an aqueous mixture capable of dispersing diepoxide resin in water. After dispersing the diepoxide resin into water, the carboxyl functional addition copolymer is esterified with the diepoxide resin to form an epoxy crosslinked copolymer in the form of microgel particles having a particle size less than about 1 micron. On a weight basis, the epoxy crosslinked addition copolymer comprises 1% to 40% diepoxide resin with the balance being between about 60% and 99% by weight carboxyl functional dispersing agent for dispersing the diepoxide resin into water.

DETAILED DESCRIPTION OF THE INVENTION

The aqueous dispersed, the microgel of addition copolymer crosslinked with diepoxide resin is produced by dispersing diepoxide resin in water with a carboxyl functional additional copolymer dispersing agent followed by crosslinking of the aqueous dispersed copolymer with the diepoxide resin.

Referring first to the acrylic dispersant for dispersing diepoxide resin into water, the acrylic dispersant is a low molecular weight addition copolymer of copolymerized ethylenic unsaturated monomers including at least 5% by weight carboxyl monomer such as acrylic acid, methacrylic acid, ethacrylic acid and similar acrylic acids, or similar acrylic type acids. Less preferred fumaric or maleic dicarboxylic acids can be used if desired to provide carboxyl functionality. Preferred compositions contain between 10% and 50% by weight carboxyl monomer based on the total ethylenic monomers copolymerized. Useful polymerizable ethylenically unsaturated monomers contain carbon-to-carbon unsaturation and include vinyl monomers, acrylic monomers, allylic monomers, acrylamide monomers, as well as the mono carboxylic unsaturated acids. Vinyl esters include vinyl acetate, vinyl propionate, vinyl butyrates, vinyl benzoates, vinyl isopropyl acetates and similar vinyl esters; vinyl halides include vinyl chloride, vinyl fluoride, and vinylidene chloride; vinyl aromatic hydrocarbons include styrene, methyl styrenes and similar lower alkyl styrenes, chlorostyrene, vinyl toluene, vinyl naphthalene, divinyl benzene; vinyl aliphatic hydrocarbon monomers include alpha olefins such as ethylene, propylene, isobutylene, and cyclohexane as well as conjugated dienes such as 1,3 butadiene, methyl-2-butadiene, 1,3-piperylene, 2,3 dimethyl butadiene, isoprene, cyclohexane, cyclopentadiene, and dicylopentadiene; vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Useful ethylenic monomers further include N-alkylol amides including acrylamides or methacrylamides such as N-methylol acrylamide, N-ethanol acrylamide, N-propanol acrylamide, N-methylol methacrylamide, N-ethanol methacrylamide, and similar alkyl acrylamide or methacrylamide monomers containing methyl, ethyl, propyl, n-butyl or iso-butyl alkyl groups. Minor amounts of functional monomers can be added, if desired, such as hydroxyl, amino, and amido functional groups containing monomers. Hydroxyl containing monomers are hydroxy containing ethylenically unsaturated monomers including hydroxy alkyl acrylates such as 2-hydroxy ethyl acrylate and methacrylate, 2-hydroxypropyl acrylate and methacrylate, and similar hydroxy alkyl acrylates. Amido containing monomers include acrylamide and methacrylamide or similar alkyl alkylol acrylamide monomers.

Carboxyl functional monomers are particularly included as previously indicated and comprise acrylic acids including acrylic and methacrylic acid, ethacrylic acid, alpha-chloroacrylic acid, alpha-cyanoacrylic acid, crotonic acid, beta-acryloxy propionic acid, and beta-styryl acrylic acid and similar acrylic acid and lower alkyl substituted acrylic acids wherein the preferred carboxylic monomers are acrylic and methacrylic acids.

Preferred ethylenic monomers suitable for the epoxy/polyester resin blend include carboxyl monomers, such as acrylic and methacrylic acid, and other ethylenic monomers such as the styrenics, the acrylate and methacrylate esters, and ethylene. The acrylic dispersant can be prepared at about 0.02 to 0.2 weight ratio of organic solvent to polymer solids at 100° C. to 175° C. in the absence of water. Glycol ether solvents such as butyl cellosolve and hexyl cellosolve are preferred. Suitable initiators include all the common peroxides, hydroperoxides, and peresters, such as benzoyl peroxide, dicumyl peroxide, t-butyl perbenzoate, and t-butyl hydroperoxide. Initiators are used at levels of about 1% to 10% based on the weight of acrylic monomers used.

On a weight basis of copolymerized ethylenic monomers, the carboxyl functional additional copolymer dispersing agent comprises between 5% and 50% copolymerized carboxyl monomer, between 5% and 95% acrylic monomers, with the balance being other ethylenically unsaturated monomers. Other carboxyl functional additional copolymers, such as poly (ethylene-acrylic acid) copolymer, are useful. The addition copolymer has a number average molecular weight between 1,000 and 50,000 preferably between 2,000 and 20,000, as measured by gel permeation chromatography. The addition copolymer should have an acid No. above 30 and preferably between 70 and 300 mgm KOH per gram of addition copolymer.

Referring next to diepoxide resins, useful diepoxide resins for crosslinking the carboxyl copolymers are predominantly linear chain molecules comprising the coreaction product of polynuclear dihydroxy phenols or bisphenols with halohydrins to produce epoxy resins containing preferably two epoxy groups per molecule. The most common bisphenols are bisphenol-A, bisphenol-F, bisphenol-S, and 4,4 dihydroxy bisphenol, with the most preferred being bisphenol-A. Halohydrins include epichlorohydrin, dichlorohydrin, and 1,2-dichloro-3-hydroxypropane with the most preferred being epichlorohydrin. Preferred diepoxide resins comprise the coreaction product of excess molar equivalents of epichlorohydrin with bisphenol-A to produce predominantly an epoxy group terminated linear molecular chain of repeating units of diglycidyl ether of bisphenol-A containing between 2 and 25 repeating copolymerized units of diglycidyl ether of bisphenol-A. In practice, an excess molar equivalent of epichlorohydrin are reacted with bisphenol-A to produce diepoxide epoxy resins where up to two moles of epichlorohydrin coreact with one mole of bisphenol-A, although less than complete reaction can produce difunctional epoxy resin along with some monoepoxide chains terminated at the other end with a bisphenol-A unit. The preferred linear epoxy resins are polyglycidyl ethers of bisphenol-A having terminating 1,2-epoxide groups (oxirane groups) and a number average molecular weight between 200 and 1,000 and preferably from about 360 to 1,000 as measured by gel permeation chromatography (GPC). Commercially available lower molecular weight epoxy resins include Dow Chemical epoxy resins identified by trade number and average molecular weights as follows: DER 333 (380); DER 661 (1050); while Shell Chemical epoxy resins are EPON 828 (380); EPON 836 (625); and EPON 1001 (1050). Preferred epoxy equivalent weight epoxy resins have an equivalent weight between 100 and 500, and preferably between 180 and 500. Higher equivalent weight epoxy resins do not disperse well, although epoxy blends containing minor amounts of high molecular weight epoxy resins are workable.

Epoxy resins further include non-aqueous alkylene oxide resins which are epoxide functional resins comprising an alkylene oxide adduct of a bisphenol compound. The alkylene oxide is an aliphatic alkyl derivative having up to about 26 carbon atoms although preferred oxides are lower alkyl oxides such as ethylene, propylene, and butylene oxides. Bisphenol compounds including bisphenol-A, bisphenol-F and bissulfone or sulfides. Typically two or more moles of alkyl oxide are coreacted with one mole of bisphenol compound. Preferred compositions are 2:1 molar reactions while a suitable number average molecular weight range of alkylene oxide resins is between 200 and 1,000 as measured by GPC. Other suitable diepoxide functional resins include low molecular weight polyepoxides such as epoxidized sorbitol and epoxy novalacs.

In accordance with the process of this invention, direct or reverse let down procedures can be used for inversion of the addition copolymer into water. Ammonia is generally used as the inverting base, because ammonia gives no added VOC. Common amines, such as dimethylethanol amine, triethyl amine, and the like can be used, alone or in combination with ammonia. The addition copolymer is best inverted hot, at its synthesis temperature, as viscosity rises at lower temperatures to the point where inversion into water is difficult. Only low to moderate shear is required for the inversion of the acrylic.

Liquid epoxy, such as DER 333 (Dow), and Epon 828 (Shell) can be blended with the carboxyl acrylic copolymer prior to, or after inversion into water. The preferred method is to add the diepoxide after the acrylic copolymer is dispersed into water to avoid possible premature reaction and gelation. Slightly advanced epoxy resin, such as DER 661, or higher molecular weight epoxy resins could be used alone, or in combination with liquid epoxy, but high molecular weight epoxy resins are not preferred. Once the addition copolymer (preferably acrylic) and the epoxy are inverted into water, heat can be applied to increase the rate of the acid-epoxy reaction. Catalysts such as tertiary amines, phosphines, pyridine, and the like can be added at low levels (0.1 to 1%) to further increase the acid-epoxy reaction rate.

Alternately, the acid-epoxy reaction in water can occur during a second stage acrylic reaction, or at room temperature over a longer period of time. Viscosity generally rises as this reaction occurs. The resulting epoxy crosslinked addition copolymers comprise an aqueous micro-dispersion of very small crosslinked polymer particles having an average microgel particle size below 1 micron, advantageously less than 0.2 microns, desirably between 0.02 and 0.1 micron, and preferably between 0.02 and 0.06 micron size microgel particles. The carboxyl functional copolymer crosslinks with diepoxide epoxy resin to provide microgel polymer particles having an Acid No. above 30 desirably between 50 and 200 and preferably between 100 and 200. The aqueous dispersed acrylic-epoxy crosslinked microgel particles provide excellent film forming properties.

On a weight basis, the crosslinked microgel particles comprise 60% to 99% addition copolymer, preferably between 60% and 90% addition copolymer, with the balance comprising difunctional epoxy resin. Preferred microgels comprise carboxyl acrylic copolymers crosslinked with diepoxide epoxy resin.

If desired, some improved film properties also can be obtained by a second stage in-situ copolymerization of ethylenic monomers in the presence of the acrylic-epoxy microgel. In this regard, common ethylenic monomers such as the styrenics, the acrylates and the methacrylates can be added to the aqueous dispersed acrylic-epoxy microgel followed by emulsion copolymerization of the ethylenic monomers in the presence of the aqueous stabilized microgel particles. Polymerization of the ethylenic monomers can be initiated with any of the common peroxide initiators, but redox initiation with systems like ascorbic acid/t-butyl perbenzoate/Fe is preferred. As polymerization occurs, large monomer droplets disappear, and the product changes from opaque to translucent in appearance (often appearing to be identical to the acrylic-epoxy microgel precursor). The small size polymer particles are thus maintained in the second stage polymerization. Crosslinking of this second stage polymerization with divinyl materials such as divinyl benzene, and 1,6-hexane diol diacrylate will further improve properties. Polymerizable ethylenically unsaturated monomers useful in the second stage contain polymerizable ethylenically unsaturated monomers contain carbon-to-carbon unsaturation and include vinyl monomers, acrylic monomers, allylic monomers, acrylamide monomers, and mono- and dicarboxylic unsaturated acids. Vinyl esters include vinyl acetate, vinyl propionate, vinyl butyrates, vinyl benzoates, vinyl isopropyl acetates and similar vinyl esters; vinyl halides include vinyl chloride, vinyl fluoride, and vinylidene chloride; vinyl aromatic hydrocarbons include styrene, methyl styrenes and similar lower alkyl styrenes, chlorostyrene, vinyl toluene, vinyl naphthalene, and divinyl benzene; vinyl aliphatic hydrocarbon monomers include alpha olefins such as ethylene, propylene, isobutylene, and cyclohex as well as conjugated dienes such as 1,3-butadiene, methyl-2-butadiene, 1,3-piperylene, 2,3-dimethyl butadiene, isoprene, cyclohexane, cyclopentadiene, and dicyclopentadiene; and vinyl alkyl ethers include methyl vinyl ether, isopropyl vinyl ether, n-butyl vinyl ether, and isobutyl vinyl ether. Useful acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Acrylic acids include acrylic and methacrylic acid, ethacrylic acid, alpha-chloroacrylic acid, alpha-cycanoacrylic acid, crotonic acid, beta-acryloxy propionic acid, and beta-styrl acrylic acid. Functional monomers include carboxyl, hydroxyl, amino, and amido functional group containing monomers. Carboxy containing monomers include acrylic acid and lower alkyl substituted acrylic acids wherein the preferred carboxylic monomers are acrylic and methacrylic acids. Hydroxyl containing monomers are hydroxy containing ethylenically unsaturated monomers including hydroxy alkyl acrylates such as 2-hydroxy ethyl acrylate and methacrylate, 2-hydroxypropyl acrylate and methacrylate, and similar hydroxy alkyl acrylates. Amido containing monomers include acrylamide and methacrylamide or similar alkyl alkylol acrylamide monomers.

In accordance with this aspect of the invention where ethylenic monomers are subsequently copolymerized in the presence of the aqueous dispersed epoxy-acrylic microgel, the polymeric binder comprises by weight at least 5% of an addition polymer of in-situ copolymerized ethylenic unsaturated monomers based on the weight of the polymeric mixture, and preferably contains between 60% and 94% carboxyl functional dispersing agent, and between 1% and 38% epoxy resin.

In respect to preforming a carboxyl functional acrylic copolymer in dispersing agent in accordance with this invention, it has been found advantageous to form a second low Tg polymer in addition to the carboxyl copolymer previously described. In this regard, a second monomer feed comprising low Tg monomers can be added during the high temperature monomer polymerization in solvent to generate a low Tg polymer. If a large proportion of low Tg monomer such as butyl acrylate or 2-ethylhexyl acrylate is used, then a second polymer having a dispersing agent low Tg is formed. The low Tg monomer can be added simultaneously or after the copolymerization of the carboxyl monomer mixture previously described. The low Tg monomer feed however need not contain carboxyl monomer for inversion into water. It has been found that a minor amount of the second low Tg addition polymer enhances film properties as well as application properties of the coating compositions such as improved flexibility and dent resistance.

The microgel dispersions have particle sizes under 1 micron and can be used as polymeric binders in coatings for containers. The resulting epoxy crosslinked microgel copolymers comprise aqueous micro-dispersion having very small crosslinked microgel polymer particles below 1 micron and preferably between 0.02 and 0.1 microns. The microgel particles produced by carboxyl functional addition copolymer (dispersing agent) crosslinked by difunctional epoxy surprisingly provides highly crosslinked copolymers in the form of a stable aqueous microdispersion of extraordinary small internally crosslinked microgel polymer particles without the need for external surfactants. Excellent protective film formations on substrates are achieved without surfactants even though the microgel particles are internally highly crosslinked. Conventional external crosslinking agents such as melamine are not required.

After the microgel has been formed, a second carboxyl functional addition copolymer of copolymerized monomer can be added to the microgel composition to provide improved spray application and flow properties to the applied coating. This copolymer is a free acrylic polymer added by simple mixing after the diepoxide crosslinking microgel formation reaction is completed. Post additions avoids crosslinking reaction between the diepoxide and the free acrylic polymer. The Acid No. of this post added carboxyl addition copolymer can be between about 40 and 300 and a copolymer can be aqueous or non-aqueous polymerized copolymer similar in composition and molecular weight as the addition copolymer dispersant previously described. The post added copolymer can be added at levels of about 2% to 20% based on the weight of the microgel particles.

Accordingly, high quality coatings for interior beverage cans can be produced with acrylic crosslinked epoxy crosslinked microgel polymeric particles. Aqueous dispersions of these blended resins can be prepared in water with ammonia neutralization with minimal use of volatile solvent and at VOC levels below about one pound per gallon of resin solids and preferably about 0.5 pound per gallon of resin solids. Cured films exhibit excellent water resistance, and good clarity and gloss.

The merits of this invention are further illustrated by the following illustrative examples. Molecular weights are number average molecular weights measured by gel permeation chromatography (GPC).

EXAMPLE 1

An acrylic-epoxy microgel was produced as follows:
  100 g hexyl cellosolve
  100 g methacrylic acid
  400 g ethyl acrylate
  12.5 g benzoyl peroxide An acrylic copolymer dispersing agent was prepared by heating hexyl cellosolve to 125° C. under nitrogen, and then feeding a mixture of the foregoing monomers and benzoyl peroxide in over 2 hours. Two grams of t-butyl perbenzoate were added, held 30 minutes at 125° C., and then cooled. The copolymer was inverted into water and reacted with epoxy as follows:
  100 g above acrylic solution
  5.0 g DER 333, liquid epoxy (Dow, EEW 190)
  400 g deionized water
  12.0 g ammonia (28% NH3)
  0.5 g ADMA-12, Ethyl Corp. (aliphatic tertiary amine)

The acrylic solution and epoxy were warmed to 100° C., and then ammonia water was added over about 5 minutes, while keeping temperature >60° C. ADMA-12 was added and the mixture was warmed to 95° C., held for 2 hours, and then cooled. Product has a 50 nm number average size by disc centrifugation.

EXAMPLE 2

An acrylic-epoxy microgel was produced as follows:
  100 g hexyl cellosolve
  125 g methacrylic acid
  375 g ethyl acrylate
  37.5 g benzoyl peroxide The monomers were copolymerized to form a preformed copolymer and then reacted with DER 333 epoxy as in Example 1, except that 14.3 g ammonia (28%) was being used. Resulting resin product has a 17 second #4 Ford cup viscosity.

EXAMPLE 3

An acrylic-epoxy microgel was produced with the above acrylic copolymer as in Example 1 except that 10 grams of DER 333 epoxy was used. Resulting product had a 24 second #4 Ford cup viscosity.

EXAMPLE 4

A microgel acrylic blend was produced as follows:
  200 g microgel from Example 1 above
  160 g deionized water
  40 g styrene
  1.0 g ascorbic acid
  10 g water
  1.0 g FeSO4 aqueous solution, 1000 ppm
  0.8 g t-butyl perbenzoate The microgel, water, and styrene was purged under nitrogen solution for 1 hour at 25° C. Ascorbic acid was added in the 10 g water at pH 7, then the Fe and initiator were added. Exotherm allowed to about 50° C. and cooled (2 hours). Then 0.4 g more initiator was added and left overnight.

EXAMPLE 5

A microgel acrylic blend was produced as in Example 4 except the microgel from Example 2 was utilized.

EXAMPLE 6

A microgel acrylic blend was produced as in Example 4 except the microgel from Example 3 was utilized.

Explanation for Table 1

Samples from Examples 1–6 were drawn down with a #12 wire wound bar on Al sheet and baked 2 minutes at 380° F. Panels were immersed for 5 minutes in boiling water to observe blush. Other panels were immersed for 30 minutes in a 1% solution of Joy detergent at 180° F., to observe blush. Results are shown in Table 1.

TABLE 1

| Sample | Water Appearance | Joy Blush | Blush |
| --- | --- | --- | --- |
| 1 | clear, glossy | 0 | 2 |
| 2 | cleae, glossy | * | 2 |
| 3 | clear, glossy | 0 | 0 |
| 4 | clear, glossy | 0 | 0 |
| 5 | clear, glossy | 1 | 2 |
| 6 | clear, glossy | 0 | 0 |

Blush: 0 = no effect, 2–3 = moderate blush, 5 = heavy blush.

EXAMPLE 7

Dispersing Agent. An acrylic copolymer dispersing agent was prepared from the following raw materials.

| | Raw Material | Grams |
| --- | --- | --- |
| (a) | butyl cellosolve | 75 |
| | hexyl cellosolve | 75 |
| | methacrylic acid | 22.5 |
| | styrene | 26.3 |
| | ethyl acrylate | 26.3 |
| (a) | methacrylic acid | 202.5 |
| | styrene | 236.3 |
| | ethyl acrylate | 236.3 |
| | dicumyl peroxide | 30 |
| (c) | ammonia (28%) | 127 |
| | water | 1000 |
| (d) | water | 517 |

Raw material components (a) were heated to about 150° C. under nitrogen in a glass reactor equipped with agitation. Components (b) were then added over about 6 hours and then held at 150° C. for about one-half hour. Components (c) were added slowly to invert and then water (d) was added for dilution and form an aqueous dispersion of copolymer dispersing agent in water.

Microgel. A microgel polymeric binder was formed with the foregoing copolymer dispersing agent as follows:

| Raw Material | Grams |
| --- | --- |
| Copolymer dispersing agent | 333 |
| water | 167 |
| DER 333 epoxy (190 eq. weight) | 40 |
| triphenyl phosphine | 0.15 |

The above raw materials including copolymer dispersing agent dispersed in water and epoxy were heated to 95° C., held for 2 hours, and then cooled to room temperature. A film applied over an aluminum substrate was baked for one minute at 380° F. metal temperature. The cured film did not exhibit blush in hot water or Joy and provided clear, glossy smooth paint films.

EXAMPLE 8

A microgel polymeric binder was prepared in the same manner as in Example 7.

Dispersing Agent. A dispersing agent was prepared as follows:

| | Raw Material | Grams |
| --- | --- | --- |
| (a) | butyl cellosolve | 100 |
| | methacrylic acid | 15 |
| | styrene | 20 |
| | butyl acrylate | 15 |
| (b) | methacrylic acid | 135 |
| | styrene | 180 |
| | butyl acrylate | 135 |
| | 20 | 20 |
| (c) | ammonia, 28% | 85 |
| | water | 700 |
| (d) | Water | 675 |

Microgel. A microgel was prepared as follows:

| Raw Material | Grams |
| --- | --- |
| copolymer dispersing agent | 400 |
| DER 333 | 40 |
| triphenyl phosphine | 0.20 |

A coating film applied to an aluminum substrate and baked as in Example 7 produced a slightly hazy cured film with comparable physical properties.

EXAMPLE 9

A microgel polymer was prepared as follows:
a) 500 g poly (ethylene-co-acrylic acid), Primacore 5980, Dow Chem, 20% acrylic acid
   1500 g water
   76 g ammonia (28% $NH_3$)
   12.4 g dimethylethanol amine
b) 100 g DER 333, Dow liquid epoxy
c) 539 g water Warm (a) to 90° C., hold 10 minutes to form polymer dispersion, and cool to 80° C. Add b), stir 5 minutes, and then add c). Hold 2 hours at 90° C., cool. Films baked for 2 minutes at 200° C. on Al panels were very clear, glossy, and hard. No film blushing was noted after 5 minutes in boiling water.

EXAMPLE 10

Acrylic Dispersion. An acrylic dispersion was prepared as follows:

| | | |
|---|---|---|
| a) | hexyl cellosolve | 114 g |
| | ethyl acrylate | 20 g |
| | methacrylic acid | 17 g |
| | styrene | 20 g |
| b) | ethyl acrylate | 180 g |
| | methacrylic acid | 154 g |
| | styrene | 180 g |
| | dicumyl peroxide | 22.8 g |
| c) | ammonium hydroxide (28% $NH_3$) | 36.2 g |
| | dimethylethanol amine | 35.4 g |
| | water | 139 g |
| d) | water | 982 g |

Heat (a) to 150° C. Add (b) over 4 hours. Hold ½ hour. Add (c) over 10 minutes, then add (d). Cool.

EXAMPLE 11

Microgel

| | | |
|---|---|---|
| a) | butyl cellosolve | 50 g |
| | hexyl cellosolve | 50 g |
| b) | butyl acrylate | 105 g |
| | styrene | 73 g |
| | methacrylic acid | 1.8 g |
| | dicumyl peroxide | 1.8 g |
| c) | methacrylic acid | 144 g |
| | styrene | 88 g |
| | ethyl acrylate | 88 g |
| | dicumyl peroxide | 6.4 g |
| (d) | water | 400 g |
| | dimethylethanol amine | 101 g |
| e) | DER 333, Dow liquid epoxy | 204 g |
| f) | water | 1931 g |

Warm (a) to 150° C., add (b) over 90 minutes, hold 5 minutes, then add (d) over 10 minutes allowing temperature to drop to 80° C. Add (e), hold 3 minutes, then add (f). Hold 2 hours at 90° C., then cool. Component (c) forms a separate low Tg copolymer.

EXAMPLE 12

Microgel Blend with Acrylic Dispersion

Combine 150 g of dispersion from example #10 with 850 g of microgel from example #11. Stir ½ hour at 60° C. Cool. Spray application on aluminum cans was rated as giving a more uniform coating than microgel of Example 11 alone.

After baking 2 minutes at 380° F., both coatings from example #3 and #4 had no blushing when exposed to boiling water for 5 minutes, or a 1% Joy detergent for 30 minutes at 180° F.

The foregoing description and examples illustrate the merits of this invention but are not intended to limit the invention except as by the appended claims.

We claim:

1. An aqueous dispersed, protective surface coating composition containing minimal amounts of volatile organic compounds at a VOC below about one pound organic solvent per gallon resin solids and containing an aqueous dispersed microgel polymeric binder, the microgel polymeric binder comprising on a weight basis:

between 60% and 99% of a preformed carboxyl addition copolymer dispersing agent of copolymerized ethylenically unsaturated monomers comprising at least 5% of a carboxyl functional monomer by weight of said copolymerized monomers, said ethylenically unsaturated monomers copolymerized in minimal amounts of organic solvent to produce a preformed copolymer having a number average molecular weight between 1,000 and 50,000 and an Acid No. above 30, where the preformed copolymer is dispersed into water;

Between 1% and 40% of an epoxy crosslinking resin having an epoxide equivalent weight between about 100 and 500 and a number average molecular weight between 200 and 1,000, the epoxy being dispersed into the water dispersed preformed copolymer dispersing agent; and where the microgel polymer is produced by the process of (a) preforming the carboxyl functional copolymer dispersing agent in organic solvent and dispersing the preformed copolymer in water to produce an aqueous dispersion of copolymer, (b) dispersing the epoxy resin into the aqueous dispersion of copolymer, and (c) crosslinking the carboxyl functional addition copolymer with the epoxy resin to produce an aqueous disperse polymer of epoxy crosslinked microgel particles of epoxy crosslinked with the addition copolymer, the crosslinked microgel particles having a particle size below 1 micron and an Acid No. above 30, where the crosslinked microgel particles are stably dispersed in water free of surfactant.

2. An aqueous dispersed, protective surface coating composition containing minimal amounts of volatile organic compounds at a VOC below about one pound organic solvent per gallon resin solids and containing an aqueous dispersed microgel polymeric binder, the microgel polymeric binder comprising on a weight basis:

between 60% and 90% of a preformed carboxyl functional addition copolymer dispersing agent of copolymerized ethylenically unsaturated monomers comprising at least 5% of carboxyl functional monomer by weight of said copolymerized monomers, said ethylenically unsaturated monomers copolymerized in minimal amounts of organic solvent to form a preformed addition copolymer having a number average molecular weight between 1,000 and 50,000 and an Acid No. between about 70 and 300, where the preformed addition copolymer is dispersed into water;

between 10% and 40% of a liquid epoxy crosslinking resin having an epoxide equivalent weight between about 100 and 500 and a number average molecular weight between 200 and 1,000, the epoxy resin being dispersed into the water dispersed addition copolymer; and where the microgel polymer is produced by the process of (a) preforming the carboxyl functional addition copolymer dispersing agent in an organic solvent and dispersing the copolymer in water to produce an aqueous dispersion of addition copolymer, (b) dispersing the epoxy resin into the aqueous dispersion of addition copolymer, and (c) crosslinking the carboxyl functional addition copolymer with the epoxy resin to produce an aqueous dispersed polymer of epoxy crosslinked microgel particles of epoxy crosslinked with the addition copolymer, the crosslinked microgel particles having a particle size below about 0.2 microns and an Acid No. above 30, where the crosslinked microgel particles are stably dispersed in water free of surfactant.

3. The coating composition of claim 1 where the crosslinked addition copolymer has an Acid No. between 100 and 200.

4. The coating composition of claim 1 where the carboxyl functional addition copolymer comprises by weight between 5% and 50% copolymerized carboxyl functional monomer with the balance being other ethylenic monomer.

5. The coating composition of claim 1 where the carboxyl functional addition copolymer comprises by weight between 5% and 50% carboxyl functional monomer and between 5% and 95% acrylic monomer with the balance being other ethylenic monomer.

6. The coating composition of claim 1 where the carboxyl functional addition copolymer is poly (ethylen-acrylic acid) copolymer.

7. The coating composition of claim 1 where the carboxyl functional addition copolymer has a number average molecular weight between 2,000 and 20,000.

8. The coating composition of claim 1 where the carboxyl functional addition copolymer has an Acid No. between 70 and 300.

9. The coating composition of claim 1 where the epoxy resin equivalent weight is between 180 and 500.

10. The coating composition of claim 1 where the epoxy resin molecular weight is between 360 and 1,000.

11. The coating composition of claim 1 where the microgel particle size is less than 0.2 microns.

12. The coating composition of claim 1 where the microgel particle size is between 0.02 and 0.1 microns.

13. The coating composition of claim 1 where the microgel particle size is between 0.02 and 0.06 microns.

14. The coating composition of claim 1 where the aqueous dispersed microgel particles contain at least 5% based on the weight of microgel particles of in-situ formed, emulsion copolymerized ethylenic monomer to produce emulsion copolymer modified microgel particles.

15. The coating composition of claim 14 where the emulsion copolymer modified microgel particles comprise on a weight basis between 60% and 94% carboxyl functional dispersing agent, between 1% and 38% epoxy crosslinking resin, with the balance being in situ formed emulsion copolymer.

16. The coating composition of claim 1 where the microgel of epoxy crosslinked addition copolymer contains between 2% and 20% of a non-crosslinked, carboxyl functional copolymer of copolymerized monomers and having an Acid No. between 40 and 300, the weight percent based on the weight of the microgel particles.

17. In a process for producing an aqueous dispersed protective coating composition having a VOC below about one pound of volatile organic solvent per gallon of resin solids and containing a binder of microgel polymer particles stably dispersed into water, the process step comprising:

provding an aqueous dispersion of preformed carboxyl functional addition copolymer dispersing agent of copolymerized ethylenically unsaturated monomers comprising at least 5% by weight carboxyl functional monomer copolymerized in solvent to form the preformed addition copolymer, the dispersing agent having a number average molecular weight between 1,000 and 50,000 and an Acid No. above 30 where the preformed addition copolymer is dispersed into water;

dispersing diepoxide resin into the aqueous dispersed dispersing agent, the diepoxide resin having an epoxide equivalent weight between 100 and 500 and a number average molecular weight between 200 and 1000;

crosslinking the carboxyl functional dispersing agent with the diepoxide resin to produce epoxy crosslinked microgel polymer particles having a particle size below 1 micron and an Acid No. above 30, where the microgel polymer particles are stably disbursed into water free of surfactant and consist by weight of 60% to 90% of said carboxyl functional dispersing agent crosslinked with 10% to 40% of said diepoxide resin.

18. The process of claim 17 where the microgel polymer particles produced and stabilized in water have an average particle size between 0.02 and 0.06 microns.

19. The process of claim 17 where the dispersing agent is first dispersed into water and then the diepoxide resin is dispersed into the aqueous dispersed dispersing agent.

20. The process of claim 17 where the carboxyl functional dispersing agent is formed by nonaqueous polymerization of monomers to form a copolymer, and then the copolymer is dispersed into water.

21. The process of claim 17 where a carboxyl functional polymer of copolymerized ethylenic monomers is added to the microgel particles without crosslinking with the carboxyl functional dispersing agent.

22. The process of claim 17 where a post addition copolymer of copolymerized ethylenically unsaturated monomers having an Acid No. between about 40 and 300 is added to the microgel polymer particles dispersed into water.

* * * * *